United States Patent
Fujikawa

(10) Patent No.: US 12,373,099 B2
(45) Date of Patent: *Jul. 29, 2025

(54) MEMORY SYSTEM AND MEMORY CONTROL METHOD

(71) Applicant: Kioxia Corporation, Tokyo (JP)

(72) Inventor: Hisashi Fujikawa, Ebina Kanagawa (JP)

(73) Assignee: Kioxia Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/481,849

(22) Filed: Oct. 5, 2023

(65) Prior Publication Data

US 2024/0028199 A1 Jan. 25, 2024

Related U.S. Application Data

(63) Continuation of application No. 17/752,259, filed on May 24, 2022, now Pat. No. 11,809,708.

(30) Foreign Application Priority Data

Sep. 17, 2021 (JP) .................... 2021-152518

(51) Int. Cl.
G06F 3/06 (2006.01)
(52) U.S. Cl.
CPC .......... G06F 3/0607 (2013.01); G06F 3/0658 (2013.01); G06F 3/0659 (2013.01); *G06F 3/0679* (2013.01)

(58) Field of Classification Search
CPC .... G06F 3/0607; G06F 3/0658; G06F 3/0659; G06F 3/0679; G06F 3/0611;
(Continued)

(56) References Cited

U.S. PATENT DOCUMENTS 7,941,588 B2 5/2011 Shiga
8,898,374 B2 11/2014 Yang
(Continued)

FOREIGN PATENT DOCUMENTS

JP 2001006374 A 1/2001
JP 2014059876 A 4/2014
(Continued)

OTHER PUBLICATIONS

Japanese Office Action dated Nov. 5, 2024, mailed in counterpart Japanese Application No. 2021-152518, 10 pages (with translation).

*Primary Examiner* — Khoa D Doan
(74) *Attorney, Agent, or Firm* — Kim & Stewart LLP

(57) ABSTRACT

According to one embodiment, a memory system includes an array of memory cells that store two or more bits of data each, and a memory controller to control writing data into the memory cells and reading from the memory cells. When a first command is received from a host, the memory controller reads data designated by the first command from the array and then rewrites the read data back into the array using a writing method in which a lower number of bits per memory cell is written than the originally stored manner of the read data. When a read command designating the rewritten data is received from the host, the memory controller reads from the array and transfers it to the host.

20 Claims, 12 Drawing Sheets

(58) Field of Classification Search
CPC ......... G06F 12/0246; G06F 2212/1024; G06F 2212/7201; G06F 2212/7206; G06F 2212/7208; G06F 3/06; Y02D 10/00
See application file for complete search history.

(56) References Cited

U.S. PATENT DOCUMENTS

| | | |
|---|---|---|
| 10,572,388 B2 | 2/2020 | Christensen |
| 2011/0222342 A1* | 9/2011 | Yoon ................ G11C 16/0483 365/185.18 |
| 2016/0306594 A1 | 10/2016 | Kim |
| 2016/0328179 A1* | 11/2016 | Quinn ................ G06F 12/0246 |
| 2017/0075812 A1* | 3/2017 | Wu .................... G06F 12/0868 |
| 2019/0303019 A1 | 10/2019 | Sunata |
| 2020/0004671 A1* | 1/2020 | Neufeld ................ G11C 16/10 |
| 2020/0073582 A1 | 3/2020 | Chang |
| 2023/0085813 A1 | 3/2023 | Fujikawa |

FOREIGN PATENT DOCUMENTS

| | | |
|---|---|---|
| JP | 2016119579 A | 6/2016 |
| JP | 2019179455 A | 10/2019 |
| TW | 202028987 A | 8/2020 |

* cited by examiner

| bit byte | 7 | 6 | 5 | 4 | 3 | 2 | 1 | 0 |
|---|---|---|---|---|---|---|---|---|
| 16 | OPERATIOM CODE(XXh) ||||||||
| 17 | Reserved |||| MODE ||||
| 18 | (MSB) ||||||||
| 19 | ||||||||
| 20 | LOGICAL BLOCK ADDRESS ||||||||
| 21 | ||||||||
| 22 | ||||||||
| 23 | ||||||||
| 24 | ||||||||
| 25 | (LSB) ||||||||
| 26 | (MSB) ||||||||
| 27 | TRANSFER LENGTH ||||||||
| 28 | ||||||||
| 29 | (LSB) ||||||||
| 30 | Reserved ||||||||
| 31 | Reserved ||||||||

…

MEMORY SYSTEM AND MEMORY CONTROL METHOD

CROSS-REFERENCE TO RELATED APPLICATION(S)

This application is a continuation of U.S. patent application Ser. No. 17/752,259, filed May 24, 2022, which is based upon and claims the benefit of priority from Japanese Patent Application No. 2021-152518, filed Sep. 17, 2021, the entire contents of each of which are incorporated herein by reference.

FIELD

Embodiments described herein relate generally to a memory system and a memory control method.

BACKGROUND

In recent years, to deal with the demand for miniaturization and larger storage capacity, semiconductor memory devices, such as NAND type memories, have been arranged in three-dimensional structures. In such types of semiconductor memory devices, a memory cell transistor may be configured as not only as a SLC (Single Level Cell) capable of storing 1-bit (2 values) data, but also as a MLC (Multi Level Cell) capable of storing 2-bit (4 values) data, TLC (Triple Level Cell) capable of storing 3-bit (8 values) data, QLC (Quad Level Cell) capable of storing 4-bit (16 values) data, and PLC (Penta Level Cell) capable of storing 5-bit (32 values) data.

However, generally, these multi-level type memory cell transistors lead to deterioration of the read limit performance, and thus, data may not be transferred at a sufficiently high speed despite increases in a host interface speed.

DETAILED DESCRIPTION

Figure 1:
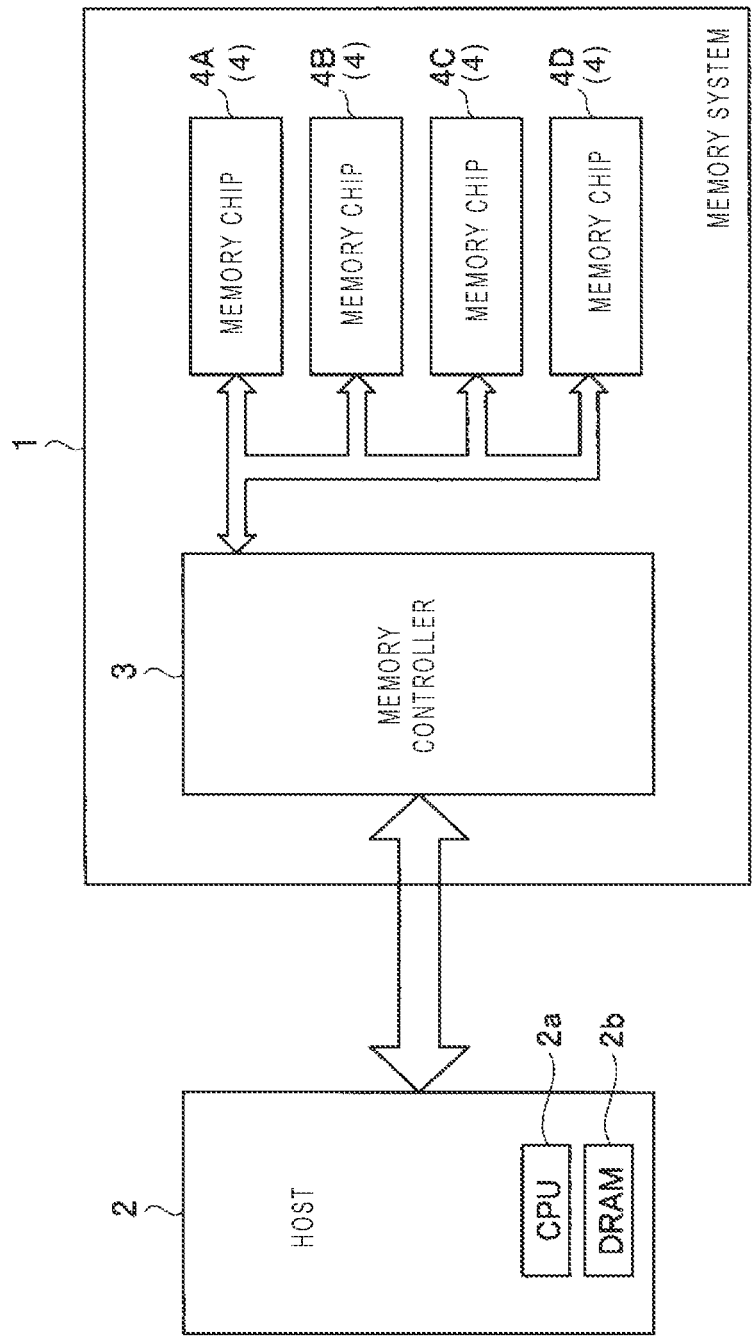
FIG. 1 is a block diagram illustrating a memory system incorporating a semiconductor device according to an embodiment.

Embodiments provide a memory system and a memory control method capable of providing a high-speed reading.

In general, according to one embodiment, a memory system includes a memory controller and a memory array having a plurality of memory cells configured to store two or more bits of data in each of the memory cells. The memory controller is configured to cause data to be written into of the plurality of memory cells using writing methods for different number of bits of data and cause the data written into the plurality of memory cells to be read. When a first command is received from a host, the memory controller is configured to cause data indicated by the first command to be read from the plurality of memory cells, and then cause the read data to be rewritten into the plurality of memory cells using a writing method for a fewer number of bits per memory cell than the writing method used to write the data to the plurality of memory cells before the reading of the data. When a read command corresponding to the data indicated by the first command is received from the host after the first command, the memory controller is configured to read the rewritten data from the plurality of memory cells, and then transfer the data to the host.

Hereinafter, certain example embodiments of the present disclosure will be described with reference to the drawings.

In general, an embodiment changes a writing method for recorded data to a writing method with a smaller transfer time, and re-records the recorded data using the changed writing method, according to a request from a host, thereby improving the read performance.

The amount of information recorded in one memory cell transistor of a NAND type memory increases from 1-bit (SLC) to 2-bit (MLC), 3-bit (TLC), 4-bit (QLC), and 5-bit (PLC). When the amount of information storable in one memory cell transistor increases in this way, the storage capacity required for a device may be achieved with a relatively small number of cells, so that the chip size may be reduced, thereby reducing the cost. However, as a memory cell is further multi-valued, that is, as the number of bits of information recorded in each memory cell transistor (referred to as the number of cell bits) increases, the number of different read voltages required to read one-bit data from a memory cell transistor increases, and thus, the time ("tR") until data is transferred to a host in response to a request from the host increases.

In addition, the value of tR is also generally a parameter of a memory cell transistor that depends on the type of NAND memory or the like. As tR increases, the limit performance of reading (referred to as the limit read performance), which corresponds to the amount of data readable per unit time, deteriorates. The limit read performance of a memory device is determined by the multiplication of values (1), (2), and (3) below.

(1) Data size (page size) that can be read per die of NAND type memory for one read request
(2) Reciprocal of tR
(3) Number of NAND dies per device In recent years, the speed of the interface between a memory device and a host (host interface) has increased. Thus, as tR increases in conjunction with use of a higher multi-value data storage technique, the limit read performance of the memory device may still be lower than the speed of the host interface. As such, the data transfer between the host and the memory device during reading will be restricted by the limit read performance of the memory device.

Therefore, in order to enhance the limit read performance, a method of increasing the page size (value (1)) or increasing the number of dies (value (3)) may be considered. However, increasing the page size causes an increase in the cost of the die of the NAND type memory, which is difficult to justify. When a method of increasing the number of dies is adopted, the storage capacity of the memory device product also generally increases, but increasing the number of dies for increasing read response times may not be considered an appropriate measure in view of other product demand for similar dies. Furthermore, when the number of dies is increased without changing the storage capacity of the device (e.g., more dies, but less storage capacity per die), then a NAND type memory die having a small storage capacity is used, which results in an increase in cost on a storage capacity basis.

In order to enhance the limit read performance of the memory device, a method of increasing the reciprocal of tR of (2) may also be considered. Even for the same memory device, multiple writing methods having different numbers of cell bits may be adopted. For example, within the same memory device, data writing may be performed using a writing method corresponding to QLC or a writing method corresponding to SLC. Therefore, at the time of data recording, the writing is performed by adopting a writing method with a small tR, that is, a writing method with a smaller number of cell bits. However, when data is recorded by adopting, for example, SLC which is a writing method with the smallest tR (the smallest number of cell bits) in order to reduce tR, there is a problem that the recordable capacity is lowered.

Therefore, in the present embodiment, at the time of writing, a recording is performed by adopting a writing method having a larger number of cell bits than that of SLC, and at the time of reading data, the data are re-recorded by a writing method with relatively smaller tR (the smaller number of cell bits) according to a request from a host, thereby enhancing the limit read performance of a memory device at the time of reading.

(Configuration of Memory System)

Figure 2:
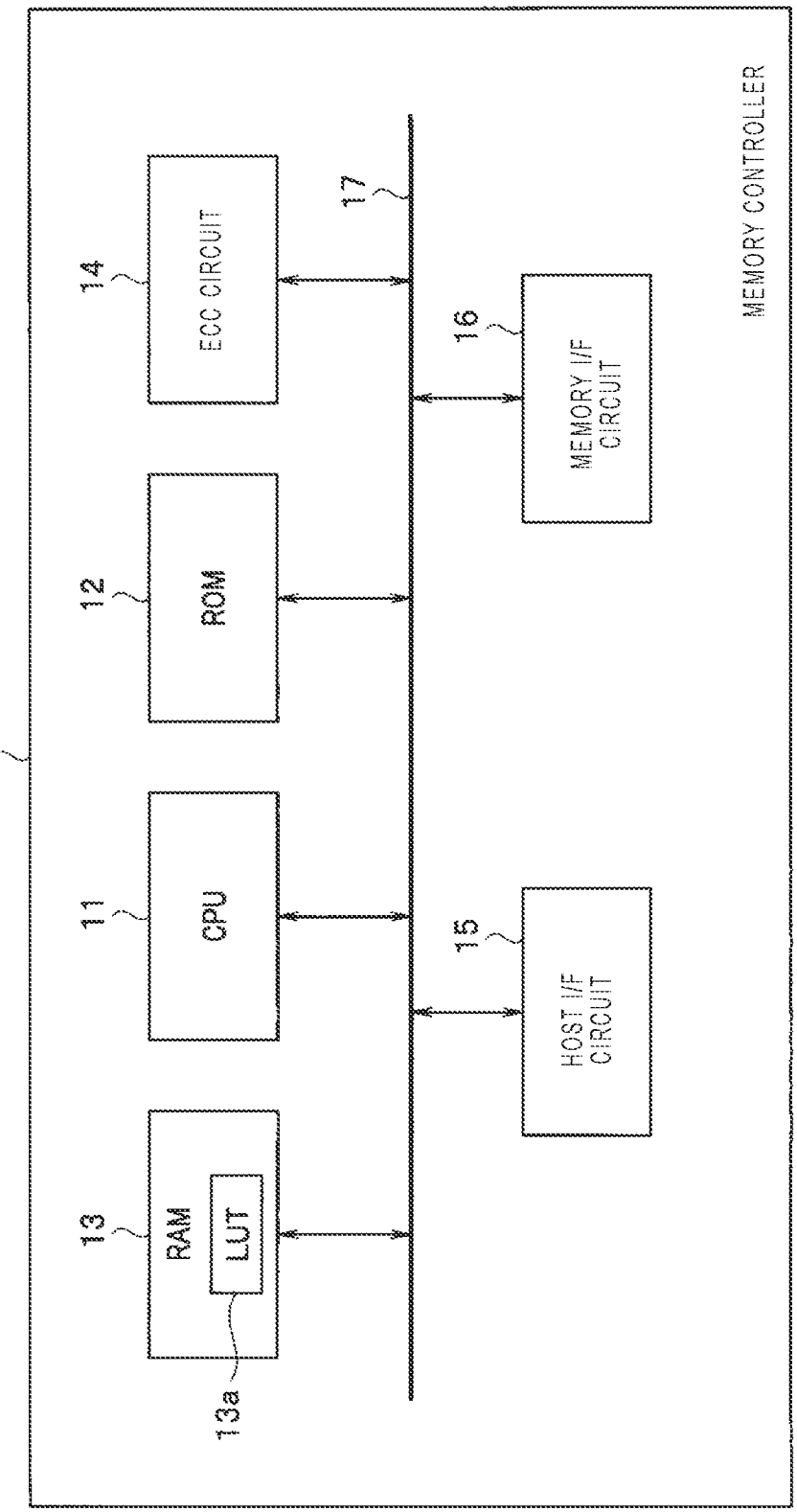
FIG. 2 is a block diagram illustrating an example of a memory controller.

FIG. 1 is a block diagram illustrating a memory system 1. FIG. 2 is a block diagram illustrating an example of a specific configuration of a memory controller 3.

A memory system 1 includes a memory controller 3 and four memory chips 4 (memory chip 4A, memory chip 4B, memory chip 4C, 4D). The number of memory chips 4 is not limited to four. The number of memory chips may be selected freely. The memory controller 3 and the memory chip(s) 4 make up a memory device.

The memory system 1 may be connected to a host 2. The host 2 is, for example, an electronic device such as a personal computer, a mobile terminal, an in-vehicle device, a server or the like. The host 2 includes a central processing unit (CPU) 2a as a processor, a ROM, and a DRAM 2b. In response to a request from the host 2, the memory system 1 stores data from the host 2 in each memory chip 4, or reads data stored in each memory chip 4 and outputs the data to the host 2. Specifically, the memory system 1 may write data into each memory chip 4 in response to a write request from the host 2, and may read data from each memory chip 4 in response to a read request from the host 2.

The memory system 1 may be a UFS (Universal Flash Storage) device or the like in which the memory controller 3 and the plurality of memory chips 4 are configured as one package, or an SSD (Solid State Drive) or the like. FIG. 1 represents a state where the memory system 1 is connected to the host 2.

The memory chip 4 is a semiconductor memory device comprising a NAND type flash memory or the like that stores data in a nonvolatile manner. As illustrated in FIG. 1, the memory controller 3 and each memory chip 4 are connected to each other via a NAND bus. The memory controller 3 controls writing of data into the memory chips 4 according to a write request from the host 2. The memory controller 3 controls reading of data from the memory chips 4 according to a read request from the host 2. The memory controller 3 may control writing of data into and reading of data from the memory chip 4 spontaneously or for other purposes instead of in response to a request from the host 2.

In FIG. 2, the memory controller 3 includes a CPU 11, a ROM 12, a RAM (Random Access Memory) 13, an ECC (Error Check and Correct) circuit 14, a host interface (I/F) circuit 15, and a memory I/F circuit 16. The CPU 11, the ROM 12, the RAM 13, the ECC circuit 14, the host I/F circuit 15, and the memory I/F circuit 16 are connected to each other by an internal bus 17.

The host I/F circuit 15 receives data from the host 2 and outputs a request, write data, and the like included in the received data to the internal bus 17. Further, the host I/F circuit 15 transmits data read from the memory chip 4, a response from the CPU 11, and the like to the host 2. The host 2 also has an I/F circuit corresponding to the host I/F circuit 15.

The host 2 and the host I/F circuit 15 are connected to each other via a predetermined interface. As for the predetermined interface, for example, various interfaces such as a parallel interface of eMMC (embedded Multi Media Card), a serial extension interface of PCIe (Peripheral Component Interconnect-Express), and a high-speed serial interface of M-PHY are adopted.

The memory I/F circuit 16 controls a process of writing data and the like into each memory chip 4 and a process of reading data and the like from each memory chip 4 based on an instruction from the CPU 11.

The CPU 11 generally controls the memory controller 3. The CPU 11 that makes up a control circuit is, for example, a CPU (Central Processing Unit), an MPU (Micro Processing Unit), or the like. When a request is received from the host via the host I/F circuit 15, the CPU 11 performs control that corresponds to the request. For example, the CPU 11 instructs the memory I/F circuit 16 to write data into each memory chip 4 in response to a request from the host 2. The CPU 11 also instructs the memory I/F circuit 16 to read data from each memory chip 4 in response to a request from the host 2.

The RAM 13 can be used to temporarily store the data received from the host 2 before storing the data in each memory chip 4, or temporarily to store the data read from each memory chip 4 before transmitting the data to the host 2. The RAM 13 is, for example, a general-purpose memory such as an SRAM (Static Random Access Memory), a DRAM (Dynamic Random Access Memory) or the like. Further, the RAM 13 is provided with an area LUT 13a that stores a logical-to-physical address conversion table.

The CPU 11 determines a storage area (memory area) on a memory chip 4 for the data stored in the RAM 13. The data are stored in the RAM 13 via the internal bus 17. The CPU 11 determines the memory area for, for example, data in page units. A page unit corresponds in size to a write unit (amount of data that can be written at the same time to a memory chip 4) and a page unit's worth of data may be referred to as page data.

A physical address is allocated to the memory area of the memory chip 4. The CPU 11 manages the allocated memory area of a data write destination by using the physical address. The CPU 11 designates the physical address of a memory area and instructs the memory I/F circuit 16 to write the data into the memory chip 4 at the selected memory area.

The CPU 11 manages a logical-to-physical address conversion table in the area LUT 13a of the RAM 13. The logical-to-physical address conversion table represents the correspondence between the logical address of the data (the logical address is managed/assigned by the host 2) and the physical address at which the data are written. When a read request including the logical address is received from the host 2, the CPU 11 specifies the physical address corresponding to the logical address, designates the physical address, and instructs the memory I/F circuit 16 to read the data accordingly.

The ECC circuit 14 encodes the data stored in the RAM 13 to generate a code word or the like. The ECC circuit 14 also decodes a code word read from each memory chip 4.

FIG. 2 represents an example of a configuration in which the memory controller 3 includes the ECC circuit 14 and the memory I/F circuit 16 as separate circuits. It is noted that the ECC circuit 14 may, in some examples, be built in the memory I/F circuit 16. In still other examples, an ECC circuit 14 may be built in each memory chip 4.

When a write request (a write command) is received from the host 2, the memory controller 3 operates as follows. The CPU 11 temporarily stores the just received write data in the RAM 13. The CPU 11 then reads the data stored in the RAM 13 and inputs the data to the ECC circuit 14. The ECC circuit 14 encodes the input data, and provides a corresponding code word to the memory I/F circuit 16. The memory I/F circuit 16 writes the code word into one or more memory chips 4.

When a read request (read command) is received from the host 2, the memory controller 3 operates as follows. The memory I/F circuit 16 provides the ECC circuit 14 with the code word read from the memory chip(s) 4. The ECC circuit 14 decodes the input code word, and stores the decoded data in the RAM 13. The CPU 11 transmits the data stored in the RAM 13 to the host 2 via the host I/F circuit 15.

Figures 3, 4:
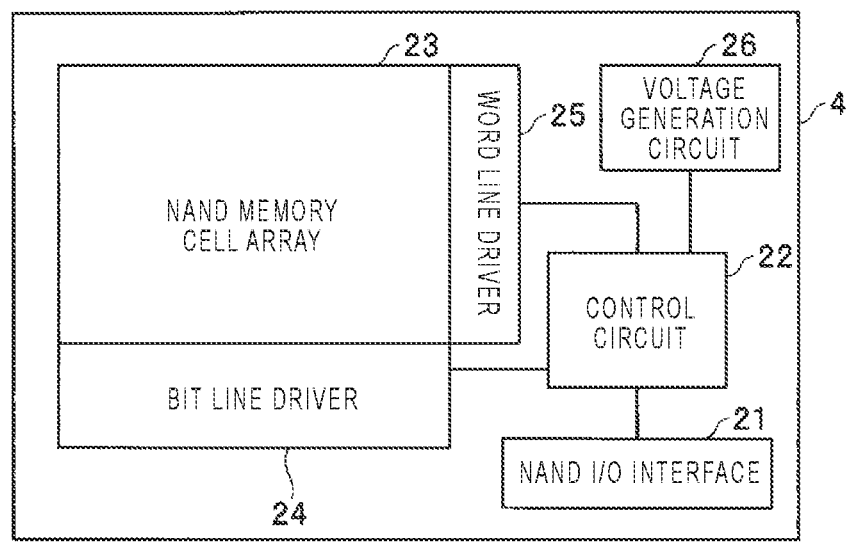
FIG. 3 is a block diagram illustrating an example of a memory chip.
FIG. 4 is a view illustrating an example of a command format for implementing a high-speed read preparation command and a write-back command.

FIG. 3 is a block diagram illustrating an example of a configuration of a memory chip 4. The memory chip 4 includes a NAND I/O interface 21, a control circuit 22, a NAND memory cell array 23, a bit line driver 24, and a word line driver 25. The NAND I/O interface 21 receives control signals such as a write enable signal (Wen), a read enable signal (Ren), an address latch enable signal (ALE), and a command latch enable signal (CLE) that may be output from the memory controller 3. The NAND I/O interface 21 also receives commands, addresses, and data output from the memory controller 3.

The bit line driver 24 is configured to be capable of independently applying voltages (or currents) to a plurality of bit lines BL, and independently detecting voltages (or currents) of the plurality of bit lines BL.

The word line driver 25 is configured to be capable of independently applying voltages to a plurality of word lines and select gate lines.

The control circuit 22 receives control signals, commands, addresses, and data from the NAND I/O interface 21, and controls the operation of the memory chip 4 based on the control signals, commands, address(es), and data. For example, the control circuit 22 controls the word line driver 25 and the bit line driver 24 based on the control signals, commands, addresses, and data, to execute a write operation, a read operation, an erase operation, and the like.

Voltages supplied to the bit line driver 24 and the word line driver 25 are generated by a voltage generation circuit 26. The voltage generation circuit 26 is controlled by the control circuit 22 to generate the required voltages. For example, the control circuit 22 controls the voltage generation circuit 26 to set a voltage to be applied to the plurality of word lines WL by the word line driver 25 and a voltage to be applied to the plurality of bit lines BL by the bit line driver 24 (a bit line voltage). In this way, writing into a memory cell transistor (also referred to as a memory cell) of the NAND memory cell array 23, reading from a memory cell transistor, and erasing of a memory cell transistor are performed.

For example, when a write command is input, the control circuit 22 controls the bit line driver 24 and the word line driver 25 to write data received along with the write command into a designated address on the NAND memory cell array 23. When a read command is input, the control circuit 22 controls the bit line driver 24 and the word line driver 25 to read data from a designated address of the NAND memory cell array 23.

(Commands of Host)

For a data recording, the CPU 2a of the host 2 generates a write command, and transmits the write command to the memory controller 3 along with a logical address of the data (for example, a head address and a data size) and the data to be written. For a data reading, the CPU 2a generates a read command, and transmits to the memory controller 3 the read command along with a logical address of the data (for example, a head address and a data size). In addition, during the data recording, in many cases, the writing is performed by, for example, a writing method that provides the largest number of cell bits in a memory device.

In the present embodiment, the CPU 2a is configured to generate a high-speed read preparation command at a predetermined timing before a data reading. The high-speed read preparation command is a command for setting a mode (a high-speed read preparation mode) in which the memory controller 3 reads data previously written by a writing method providing a relatively large number of cell bits and then re-records this previously written data using a writing method providing a smaller number of cell bits than that at the time of the initial writing. When transmitting the high-speed read preparation command, the CPU 2a transmits information to the memory controller 3 including or indicating the logical address of data which is highly likely to be read in conjunction with a subsequently sent read command.

For example, in game data, OS (operating system) data, etc., there is data that is more frequently used or data that needs to be read at a higher speed than other data. Also, there may be written data that is highly likely to be accessed again immediately after the data is written (temporal locality) or data of an address adjacent to an address of read data may be highly likely to be accessed (spatial locality).

The CPU 2a having knowledge about the data access pattern or expectations, designates a logical address of such data (high-speed read data), and transmits the logical address to the memory controller 3 together with the high-speed read preparation command.

At the time of initial data writing, it is also conceivable simply to perform the recording by a writing method corresponding to SLC. However, there may be not only data that requires the high-speed reading at all times, but also data that requires the high-speed reading only for a certain period of time, depending on, for example, the characteristics of a program being executed on the host 2. Use of the high-speed read preparation command as in the present embodiment may be extremely effective with respect to optimizing storage capacity and read times when the high-speed reading of certain data is desired to be performed during a certain period rather than constantly or the like.

FIG. 4 is a view illustrating an example of a command format for implementing the high-speed read preparation command and a write-back command. FIG. 4 corresponds to a UFS device example.

In the UFS protocol, a command UPIU (UFS Protocol Information Unit) is used to transmit commands from a host to a device, and a CDB (Command Descriptor Block) from byte[16] to byte[31] in the command UPIU is used to implement various types of commands. The example of FIG. 4 is an example of a format of the high-speed read preparation command and the write-back command using this CDB.

The "OPERATION CODE" is a newly established command number. The "MODE" describes information that distinguishes whether a command is a "high-speed read preparation command" or a "write-back command". The "LOGICAL BLOCK ADDRESS" indicates a logical address. The "TRANSFER LENGTH" indicates a target data size.

For example, the host 2 transmits a high-speed read preparation command in a format illustrated in FIG. 4 to the memory controller 3. When the high-speed read preparation command is received, the CPU 11 of the memory controller 3 executes the high-speed read preparation mode. That is, the CPU 11 refers to the data deployed in the LUT 13a to convert a logical address designated by the host 2 into a physical address. The CPU 11 transmits the converted address and a read command to the memory chip 4. As a result, the control circuit 22 of the memory chip 4 drives the bit line driver 24 and the word line driver 25 to read data from an address designated by the memory controller 3, and transmits the data to the memory controller 3. The CPU 11 stores the read data in the RAM 13.

The CPU 11 next selects a writing method having number of cell bits providing a high-speed read data, and writes the data stored in the RAM 13 back in the memory chip 4 using the selected writing method. In this case, the CPU 11 designates an address corresponding to the selected writing method. That is, the CPU 11 updates the LUT 13a to change the physical address corresponding to the read data to a physical address corresponding to the location of the data to be rewritten (using a lower cell bit number), and transmits this physical address and a write command to the memory chip 4. The control circuit 22 of the memory chip 4 drives the bit line driver 24 and the word line driver 25 based on the designated address, and (re)writes the data using the designated writing method.

(Operation)

Figure 5:
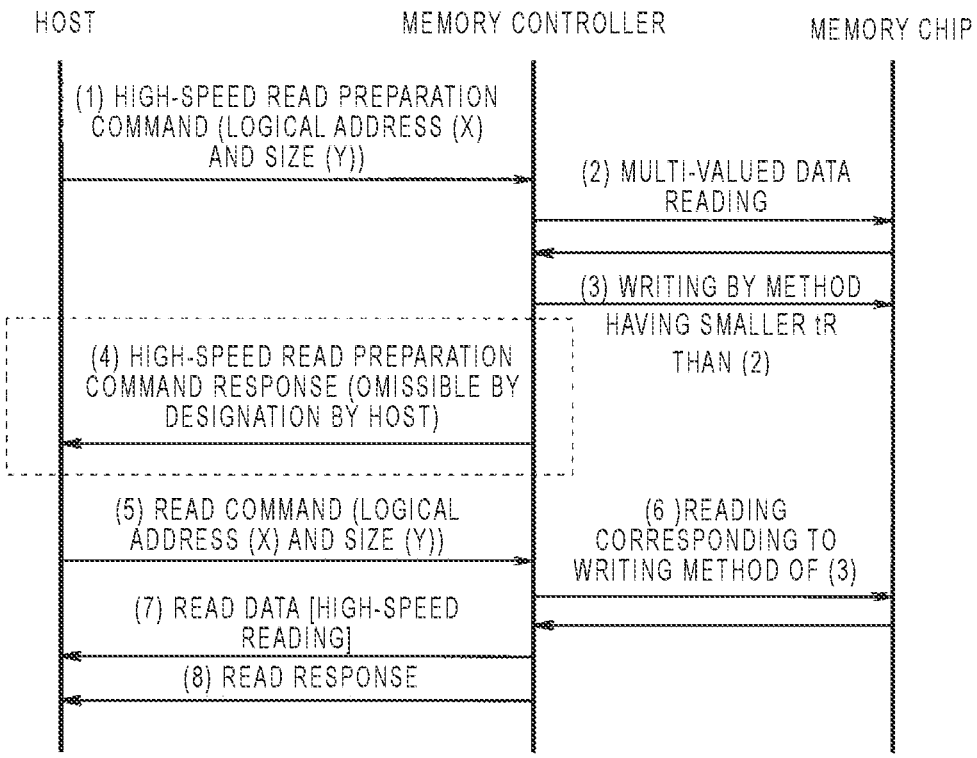
FIG. 5 is a timing chart for reading in a first embodiment.
Figure 6:
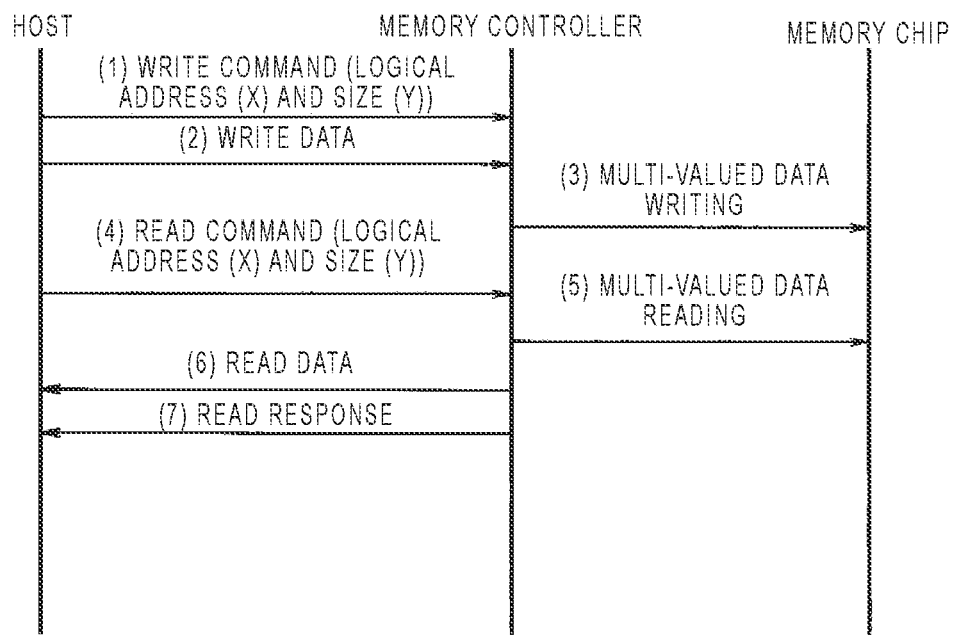
FIG. 6 is a timing chart for writing and reading in a comparative example.
Figure 7:
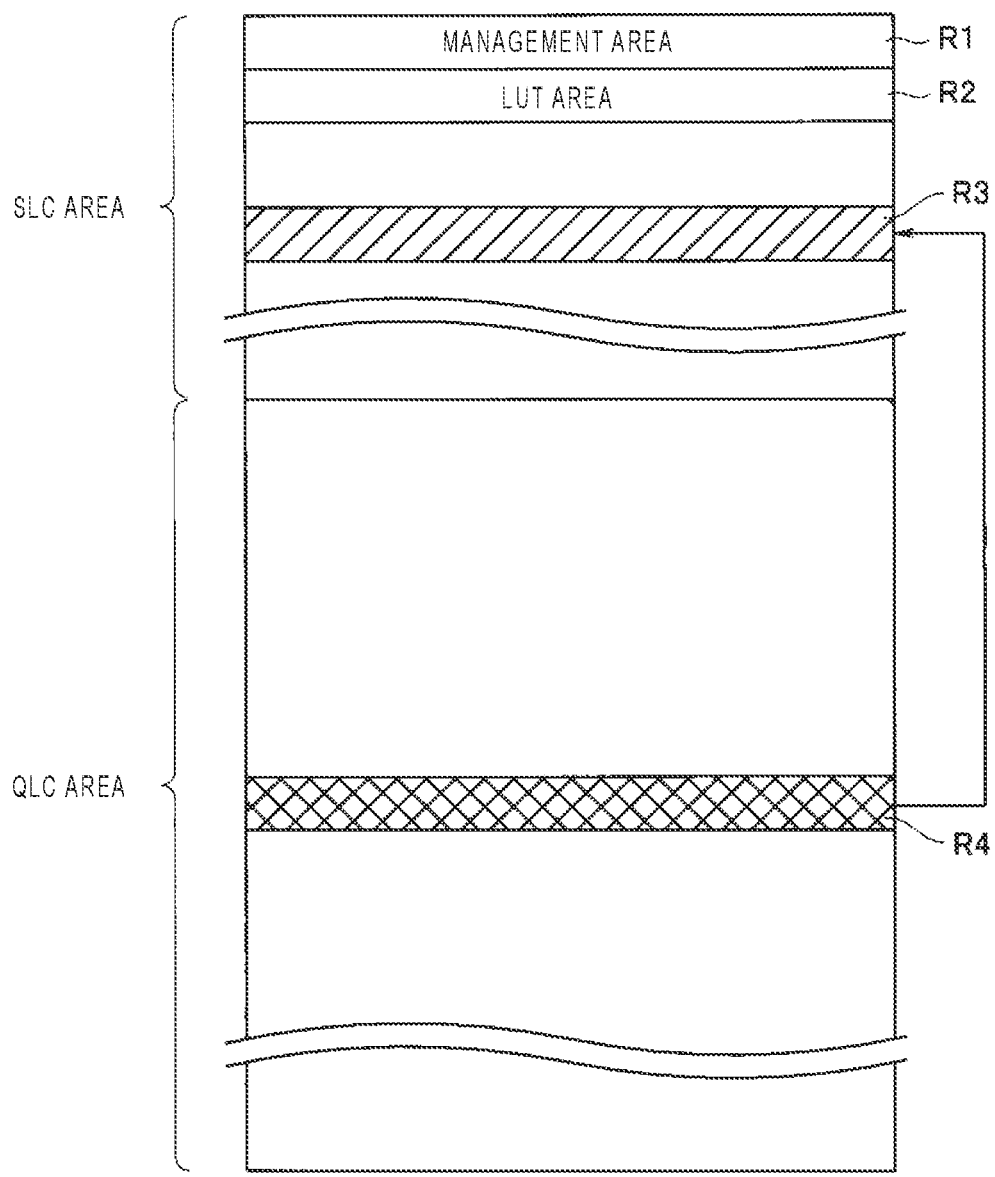
FIG. 7 is a memory map representing a memory area of a memory chip.
Figure 8:
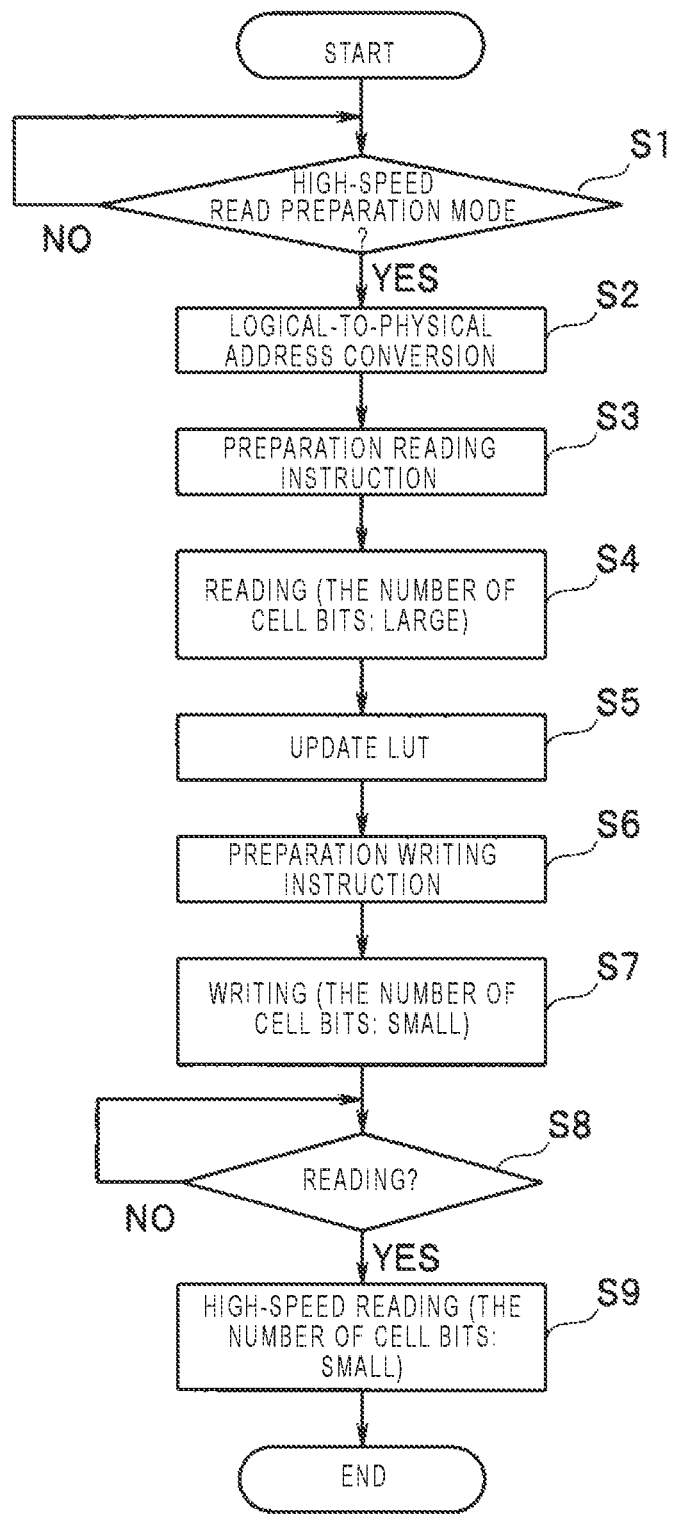
FIG. 8 is a flowchart illustrating an operation of a first embodiment.

FIG. 5 illustrates a timing chart for a reading in a first embodiment, and FIG. 6 illustrates a timing chart for writing and reading in a comparative example. FIG. 7 illustrates a memory map representing a memory area of the memory chip 4, and FIG. 8 is a flowchart illustrating the operation of the first embodiment.

First, the writing and reading operations of a comparative example illustrated in FIG. 6 will be described. For writing, the host 2 generates a write command, and outputs a logical address (head address (X) and data size (Y)) of data to be written and the data to be written (write data) to the memory controller 3 ((1) and (2) in FIG. 6). The memory controller 3 converts the logical address of the write data into a physical address by logical-to-physical address conversion and updates the LUT 13a accordingly. The memory controller 3 then designates the physical address and transmits the write data to the memory chip 4. The memory chip 4 writes the write data into a memory area of the NAND memory cell array 23 designated by the physical address. In addition, the memory controller 3 also gives an instruction to the memory chip 4 to write the write data using a writing method corresponding to some predetermined number of cell bits. For example, the writing is performed by a writing method corresponding to QLC ((3) in FIG. 6: multi-value data writing).

Next, it is assumed that the host 2 issues a read command to read the data written in the memory chip 4. In this case, the host 2 generates a read command, and outputs the logical address (head address (X) and data size (Y)) of the data to be read to the memory controller 3 ((4) in FIG. 6). The memory controller 3 checks the LUT 13a to convert the logical address of the read data into a physical address, designates the converted physical address, and then reads the data of the memory chip 4 ((5) in FIG. 6): multi-valued data reading). This data now being read was previously written by, for example, a writing method having a large number of cell bits such as QLC, and the control circuit 22 of the memory chip 4 thus performs a read control corresponding to the previous writing method to acquire read data, and then transfers the acquired read data to the memory controller 3. The memory controller 3 transfers the received read data to the host 2 as part of a read (command) response ((6) and (7) in FIG. 6). As described above, in reading data written by the writing method having a large number of cell bits, the tR is large.

For the present embodiment, the operations at the time of initial data writing is generally the same as that of the comparative example. The present embodiment differs from the comparative example in that the high-speed read preparation mode is executed before the reading of the previously written data in response to a read command. FIG. 5 illustrates only the operation at the time of reading since the operation at the time of writing corresponds generally to (1), (2), and (3) of FIG. 6, already described. For the reading, the host 2 generates a high-speed read preparation command at some time before the actual data reading is required by the host 2. That is, the CPU 2a of the host 2 transmits the logical address (head address (X) and data size (Y)) of the data determined to require high-speed reading (high-speed read data) and the high-speed read preparation command to the memory controller 3 ((1) in FIG. 5). The CPU 11 of the memory controller 3 is initially in the standby state (S1 in FIG. 8) waiting for a high-speed read preparation mode instruction. When the high-speed read preparation command and the logical address are received (YES in S1), the CPU 11 executes the high-speed read preparation mode. That is, the CPU 11 performs a control (preparation read control) of referring to the LUT 13a to convert the received logical address into a physical address (S2), designating the converted physical address, and reading the data of the memory chip 4. The data instructed to be read may have been previously written using a writing method having a large number of cell bits such as QLC, and the control circuit 22 of the memory chip 4 performs the reading corresponding to the previously utilized writing method ((2) in FIG. 5: multi-valued data reading) to acquire the high-speed read data, and then transfer the acquired high-speed read data to the memory controller 3 (S4).

In the preparation read control, the CPU 11 stores the received high-speed read data in the RAM 13. The CPU 11 next writes the high-speed read data (as read in the preparation read control) back into the memory chip 4 using a writing method with the smaller number of cell bits (so tR is smaller) ((3) in FIG. 5). For example, when the high-speed read data was previously written by a writing method corresponding to QLC, the subsequent writing is performed by a writing method corresponding to TLC, MLC, or SLC. The CPU 11 selects a memory area into which the high-speed read data is to be rewritten, and updates the LUT 13a accordingly. The CPU 11 transmits a command for causing the high-speed read data to be written again to the memory chip 4 together with a write destination address (S6) (referred to as preparation write control). The control circuit 22 of the memory chip 4 writes the high-speed read data into the memory area of the designated NAND memory cell array 23 (S7). In this case, the control circuit 22 controls each unit to write the data using a writing method in which tR is small. For example, the writing is performed by a writing method corresponding to SLC.

FIG. 7 illustrates a memory area before and after such preparation write control. In the example of FIG. 7, the NAND memory cell array 23 is set with two memory areas including one area for performing writing using an SLC writing method and the other area for performing writing using a QLC writing method. Although the SLC/QLC writing methods are set as the usage methods, the area for designated for each method is not completely fixed. An SLC area includes a management area and a LUT area for storing a logical-to-physical address conversion table. In this example, the high-speed read data was initially written in an area R4 in a QLC area. In the high-speed read preparation mode, the memory controller 3 read the high-speed read data from the area R4, and then wrote the high-speed read data in an area R3 in the SLC area. After the high-speed read preparation mode is completed, the physical address of the high-speed read data stored in the LUT 13a indicates the area R3.

When the preparation write control is completed, the CPU 11 of the memory controller 3 generates a high-speed read preparation command response indicating that the high-speed read preparation mode has been completed, and transmits the high-speed read preparation command response to the host 2 ((4) in FIG. 5). In some examples, the high-speed read preparation command response can be omitted by the designation by the host 2 or the like.

Next, the host 2 requests the high-speed read data written in the memory chip 4. That is, the host 2 generates a read command and outputs a logical address (head address (X) and data size (Y)) of the high-speed read data to the memory controller 3 ((5) in FIG. 5). The memory controller 3 is at this time in a read command standby state in S8, and when the read command is received (YES in S8), the memory controller 3 refers to the information in the LUT 13a to convert the logical address of the high-speed read data into a physical address, designates the converted physical address (the physical address indicating the area R3 in FIG. 7 in this example), and reads the data of the memory chip 4 (S9, (6) in FIG. 5). This high-speed read data was (re)written using a writing method having a small number of cell bits such as SLC in the preparation write control, and the control circuit 22 of the memory chip 4 performs a read control corresponding to the writing method to acquire high-speed read data. The control circuit 22 transfers the acquired high-speed read data to the memory controller 3. The memory controller 3 transfers the received high-speed read data to the host 2, and transmits a read response to the host 2 ((7) and (8) in FIG. 5). Since high-speed read data was (re)written using a writing method having a small tR (small number of cell bits), high-speed reading is possible.

In this way, in the present embodiment, it is possible to enhance the performance at the time of data reading by changing a writing method of recorded data to a writing method with smaller tR, and re-recording the recorded data according to the request from the host. This prevents the data transfer speed from the memory device to the host from being limited by tR, thereby enabling the high-speed data reading. Furthermore, by targeting only the data specifically designated by the host 2 for this rewriting process, it is possible to prevent an adverse effect on the recordable capacity of the device.

Second Embodiment

Figure 9A:
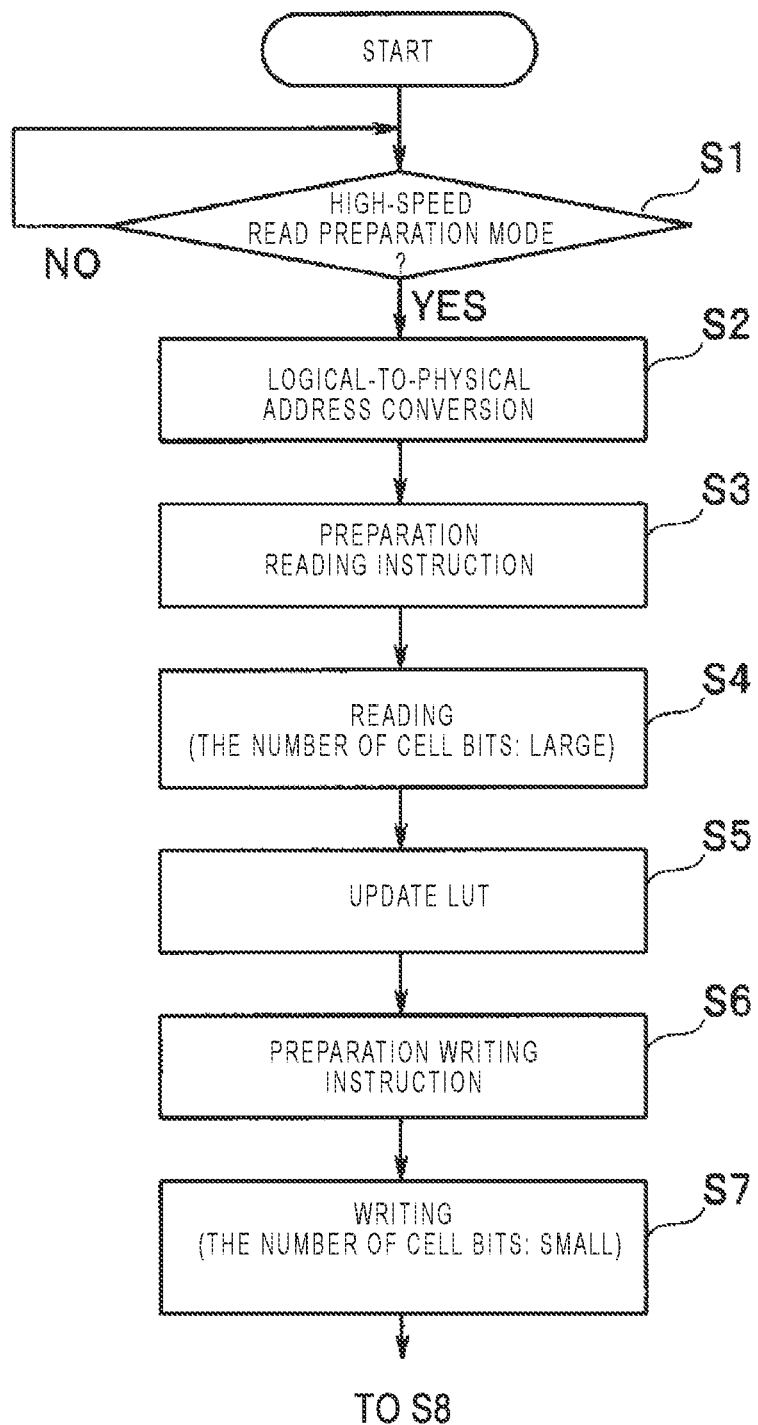
FIGS. 9A and 9B are flowcharts illustrating an operation flow adopted in a second embodiment.
Figure 9B:
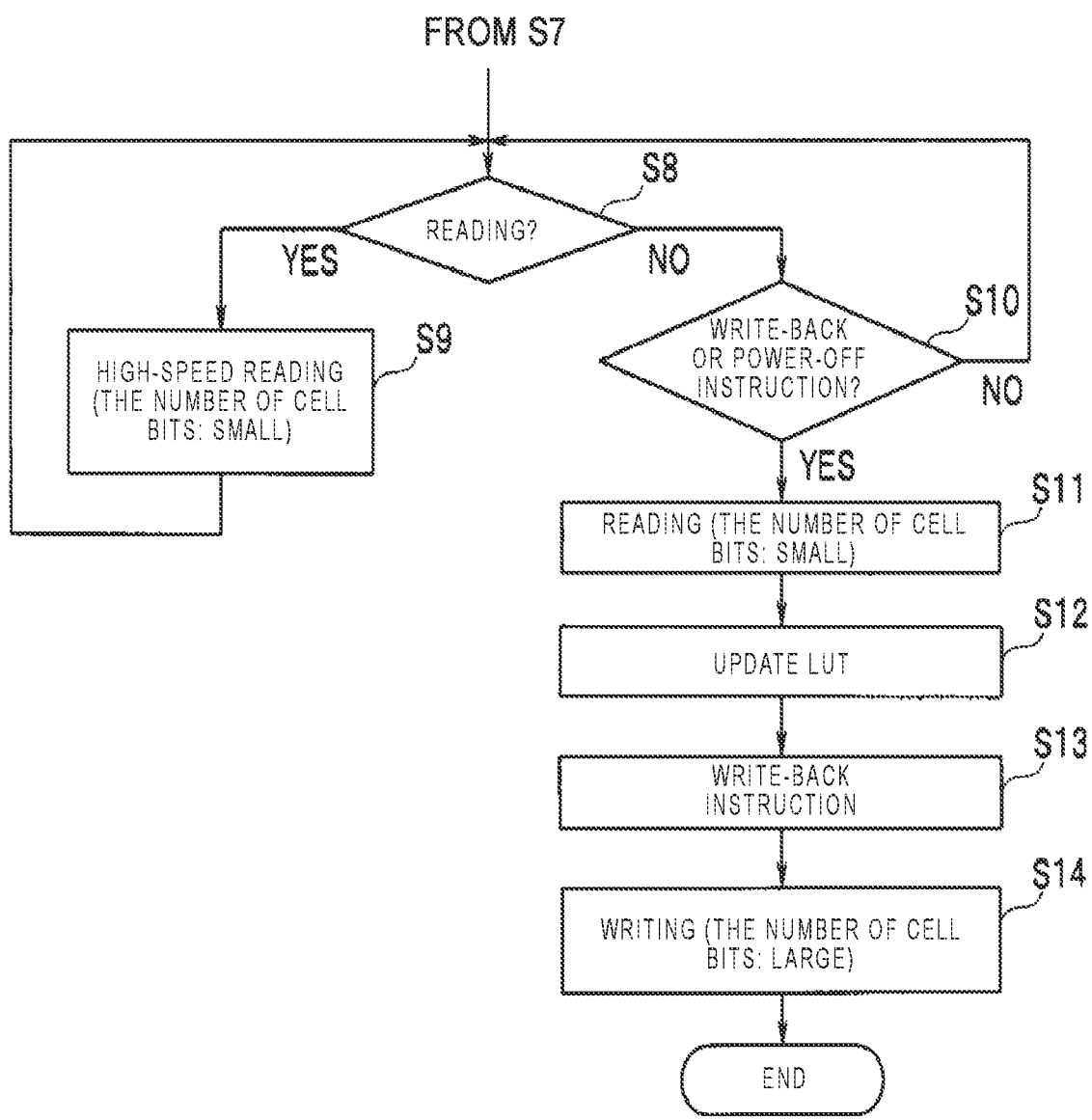

FIGS. 9A and 9B are a flowchart illustrating an operation flow adopted in a second embodiment. In FIGS. 9A and 9B, the same procedures as those in FIG. 8 will be denoted by the same reference numerals, and descriptions thereof will be omitted. The hardware configuration of the second embodiment is the same as that of the first embodiment.

In the first embodiment, the read performance is enhanced by adopting the high-speed read preparation mode. In the high-speed read preparation mode, since the data recorded by the writing method having a large number of cell bits must be re-recorded by a writing method having a smaller number of cell bits, the recording density of the memory cell transistor is reduced, thereby reducing the maximum recordable capacity of the memory device. Therefore, the second embodiment involves controlling data that do not need to be read at a high speed to be written back by a writing method in which the number of cell bits is increased again.

As in the first embodiment, the host 2 may issue a high-speed read preparation command, but then also may issue a write-back command for writing-back the high-speed read data using a writing method having a larger tR (larger number of cell bits). In some examples, when the memory area in which the high-speed read data is written to a predetermined area by the preparation write control, the host 2 may issue just the write-back command without designating a logical address corresponding to the individual high-speed read data. In some examples, when high-speed read data is to be returned to normal speed read data, the host 2 may issue a logical address for designating the high-speed read data to be written back together with the write-back command.

The CPU 11 of the memory controller 3 determines in S8 of FIG. 9B whether or not a read instruction has been received. When it is determined that there has been no read request (NO in S8), the CPU 11 next determines, in S10, whether or not a write-back instruction or a power-off instruction has been received. When no write-back instruction or power-off instruction has been received (NO in S10), the CPU 11 returns the process to S8 to determine whether or not a read request has been received.

If the host 2 generates a write-back command and transmits this command to the memory controller 3, once the write-back command is received (YES in S10), the CPU 11 of the memory controller 3 performs write-back control for writing back the high-speed read data using a writing method having a larger number of cell bits. In the write-back control, the CPU 11 designates a physical address of the memory area of the high-speed read data stored in the LUT 13a, and reads the data (S11). The CPU 11 stores this read data in the RAM 13. Next, the CPU 11 updates the physical address of the memory area of the high-speed read data stored in the LUT 13a to a physical address of the memory area corresponding to the writing method having a larger number of cell bits, and updates the contents of the LUT 13a (S12). The CPU 11 designates the updated physical address and transmits a write-back instruction of the high-speed read data to the memory chip 4 (S13).

The control circuit 22 of the memory chip 4 writes the data to be written back into the memory area of the designated NAND memory cell array 23 (S14). In this case, the control circuit 22 controls each unit so as to increase the number of cell bits. For example, in the case of the memory chip 4 corresponding to QLC, writing is performed by a writing method corresponding to QLC.

If the power is to be turned off, the host 2 may issue a write-back command before the power is turned off, and may control all high-speed read data to be re-recorded using a writing method having a larger number of cell bits. Alternatively, when the power-off is instructed, even though the write-back command was not received, the memory controller 3 may automatically control all the high-speed read data to be re-recorded using a writing method having a larger number of cell bits before the power is turned off. The process S10 in FIG. 9B represents an example of this particular case.

Before the power is turned off, the CPU 11 transfers the contents of the LUT 13a to the memory chip 4, and stores the contents in an area R2 of the NAND memory cell array 23.

In this way, by using the write-back command, the host 2 can store just the necessary high-speed read data for a required period using a writing method having a small tR. As a result, it is possible to enhance the read characteristics while mitigating any influence on the overall storage capacity of the memory device.

(Modifications)

Figure 10:
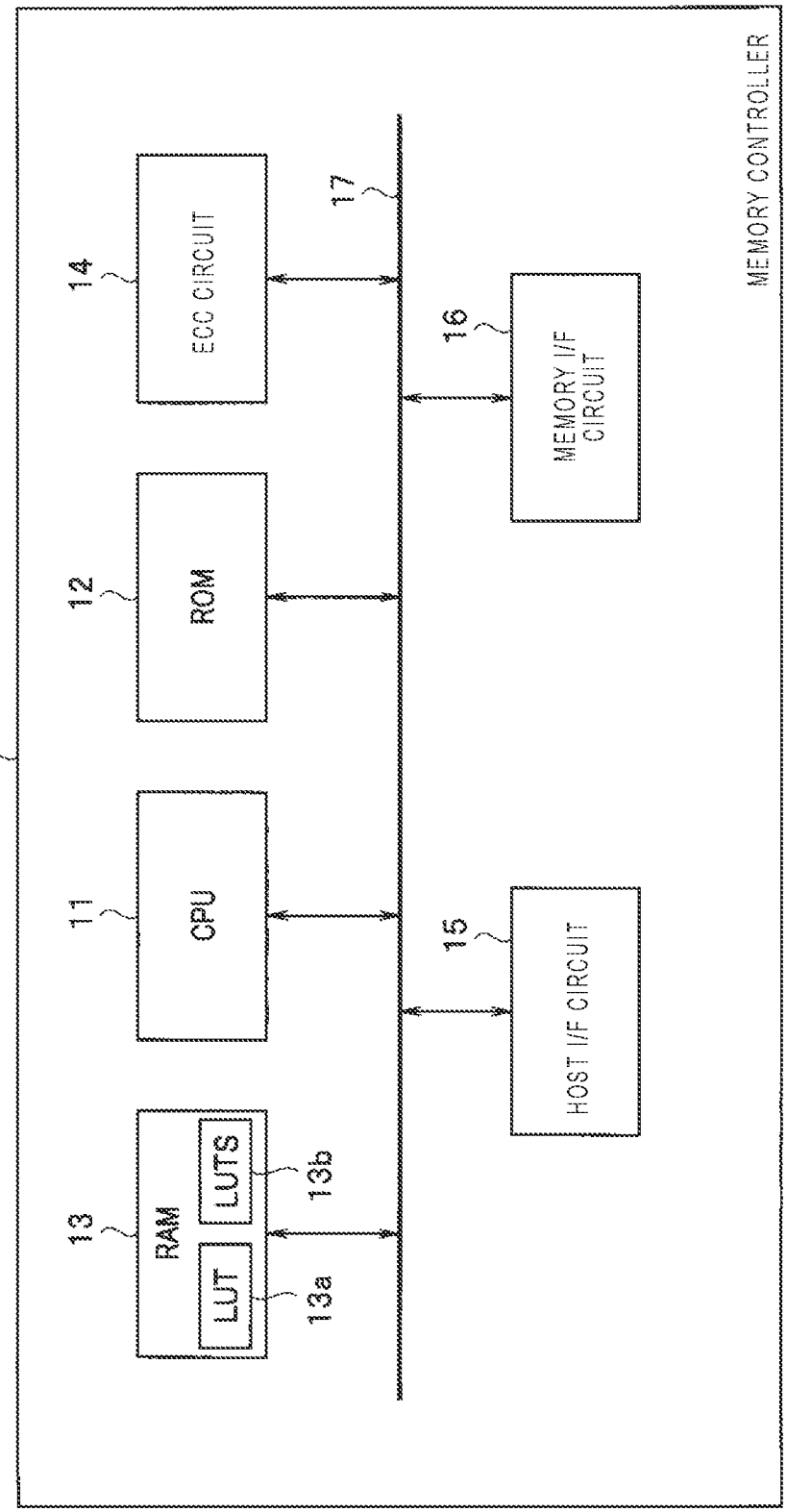
FIG. 10 is a block diagram illustrating a modification of a memory system.

FIG. 10 is a block diagram illustrating a modification. The components in FIG. 10 which are substantially the same as those in FIG. 2 are denoted by the same reference numerals.

In the second embodiment, high-speed read data initially recorded by the writing method having a large number of cell bits may not be readable from the same location thereafter (move mode reading). However, since generally write-back control is to be later performed, the data at the initial recording location may be read and left un-erased at the initial recording location (copy mode reading). Therefore, in the present modification, the initial memory area for the high-speed read data recorded using the writing method having a large number of cell bits can be stored, and for later write back, the LUT 13a can be updated to again indicate the initial memory area as the location of the data rather than the high-speed read area (e.g., the SLC area). In the write-back control, the high-speed read data recorded using a writing method having a smaller number of cell bits in the high-speed read area (e.g., the SLC area) can be erased. For example, the CPU 11 enables the copy mode reading by storing information indicating the correspondence between a physical address of the memory area of the high-speed read data recorded using the writing method having a large number of cell bits, and a logical address, in an area LUTS 13b of the RAM 13. Then, the CPU 11 updates the LUT 13a by using the information of the LUTS 13b at the time of the write-back control. In the write-back control, after the LUT 13a is updated, the high-speed read data recorded using the writing method having a smaller number of cell bits can be erased.

Figure 11A:
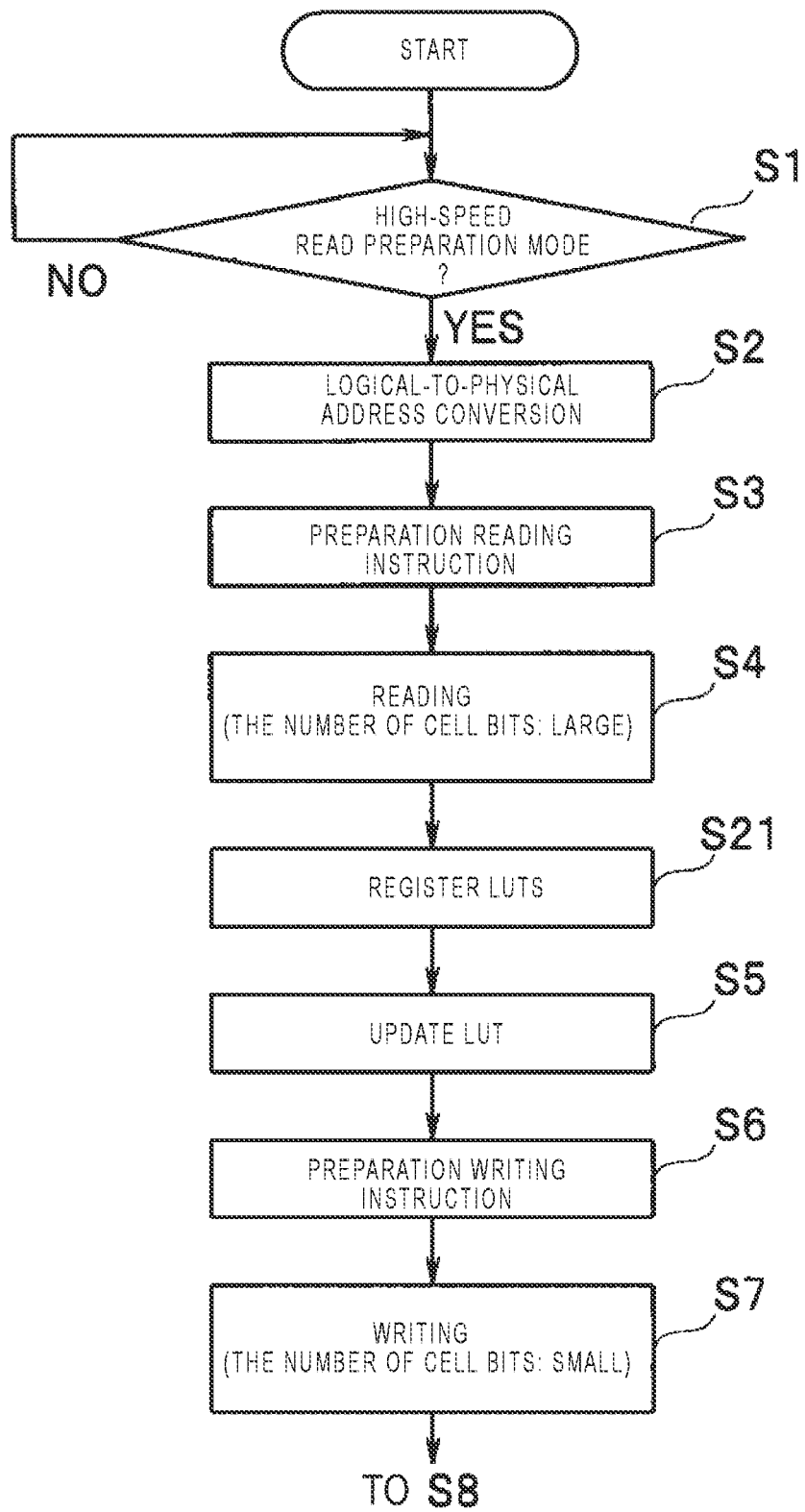
FIGS. 11A and 11B are flowcharts illustrating an operation of a modified memory system.
Figure 11B:
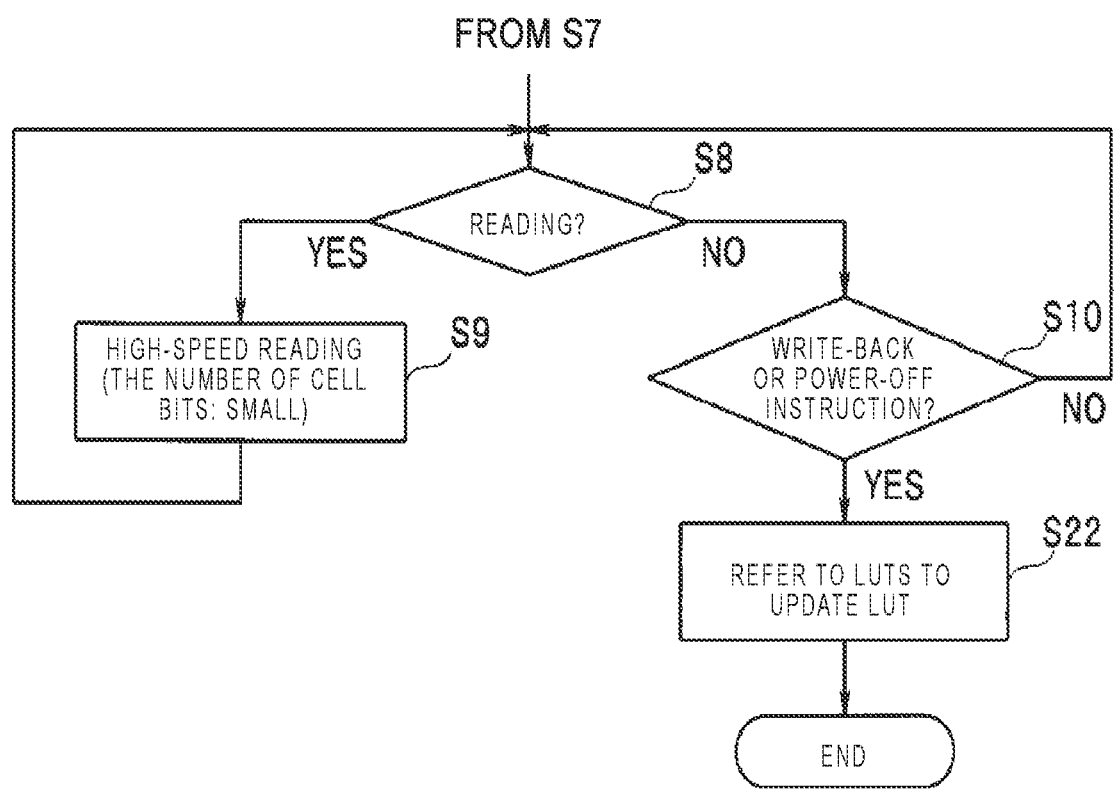

FIGS. 11A and 11B are a flowchart illustrating the operation in this modification. The same processes in FIGS. 11A and 11B as those in FIG. 8 are denoted by the same reference numerals.

As illustrated in FIGS. 11A and 11B, when a reading is performed by the preparation read control, the CPU 11 registers the correspondence between the read physical address and the logical address in the LUTS 13b (S21). The CPU 11 then updates the LUT 13a with the physical address of the write destination of the preparation write control (S5). As a result, in the subsequent reading of the high-speed read data, the high-speed read data written by the writing method having a small number of cell bits is read. When the write-back command or the power-off instruction is received (YES in S10), the CPU 11 reads the correspondence relationship between the physical address in which the high-speed read data was originally written, and the logical address, from the LUTS 13b, and updates the physical address information of the correspondence relationship between the physical address stored in the LUT 13a and the logical address (S22). As a result, the high-speed read data stored in the NAND memory cell array 23 is subsequently read by the writing method having a large number of cell bits, which may reduce the influence on the capacity of the memory area.

In this way, by storing the high-speed read data read by the preparation read control in a state in which the high-speed read data is not erased (the area may also be protected from other data operations or reserved), once the write-back control is performed, it can be handled by just updating the logical-to-physical address conversion table, and therefore, actual reading and writing of data for the write-back control can be omitted.

In the above description, an example in which the memory controller 3 performs one of the move mode reading and the copy mode reading was described. Alternatively, these reading modes may be switchable. For example, the memory controller 3 may be dynamically switchable, such as performing the copy mode reading when a free space is larger than a predetermined threshold value, and performing the move mode reading when the free space is equal to or less than the predetermined threshold value.

In some examples, the host 2 may add an ID to the data so that when the power is turned off, the high-speed read data for which write-back control is to be performed and high-speed read data for which the write-back control is not to be performed may be designated in advance with the ID by the memory controller 3. In this case, the memory controller 3 may record the correspondence relationship between the ID and the logical address/the physical address in the RAM 13, and when a power-off instruction is issued, the memory controller 3 may refer to the ID to determine the high-speed read data for which the write-back control is to be performed.

(Modification)

Figure 12:
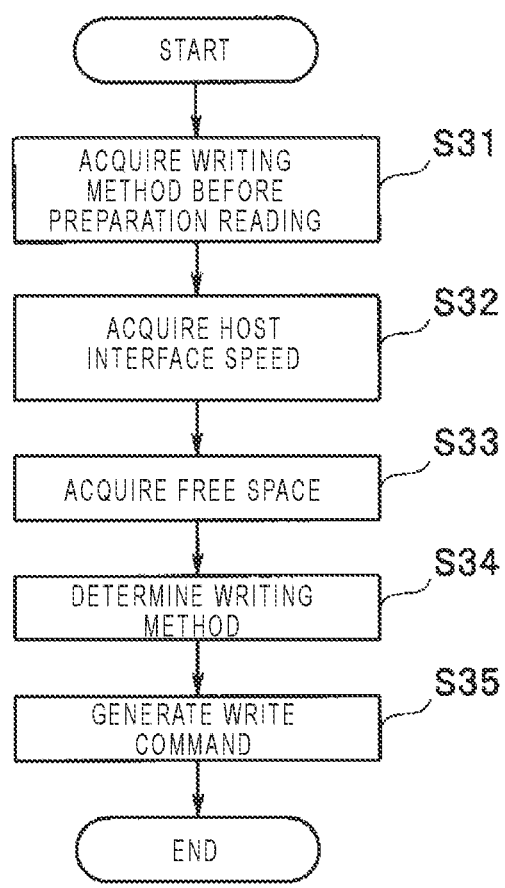
FIG. 12 is a flowchart illustrating a modification.

FIG. 12 is a flowchart illustrating another modification. In each of the above embodiments, it was described that the CPU 11 selects a writing method having a smaller tR than the original writing method of the acquired high-speed read data when performing the preparation write control. This modification concerns an example of this selection.

In FIG. 12, the CPU 11 acquires the original writing method of the high-speed read data, that is, the writing method of the high-speed read data recorded in the NAND memory cell array 23 before the preparation read control (S31). For example, assuming that this writing method corresponds to QLC, a writing method corresponding to SLC, MLC, or TLC is a candidate as the writing method at the time of preparation write control.

The CPU 11 controls the RAM 13 and the host I/F circuit 15 to acquire information on the host interface speed and the free capacity of the NAND memory cell array 23 (S32 and S33). The CPU 11 then selects the writing method at the time of preparation write control based on this acquired information (S34). That is, the CPU 11 adopts a writing method in which tR (the number of cell bits) is selected to obtain the limit read performance faster than the host interface speed if possible. For example, if a limit read performance faster than the host interface speed can be obtained by use of TLC or MLC, then TLC or MLC may be used instead of SLC. The CPU 11 selects a writing method corresponding to SLC when a sufficiently high-speed limit read performance cannot otherwise be obtained.

In addition, the CPU 11 adopts a writing method that can leave a sufficient free space. For example, when the desired limit read performance faster than the host interface speed can be obtained with any of SLC, MLC, and TLC, a writing method in which the available free space is kept larger may be adopted.

In this way, in this modification, it is possible to enhance the limit read performance while still providing a sufficient free space.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:
   a memory array; and
   a controller configured to:
   when a write command is received is received from a host device, cause first data to be written into the memory array by a first method which provides a first read transfer time to the host device when the first data is read,
   when a first command is received, cause the first data written by the first method to be read from the memory array, then rewritten into the memory array by a second method which provides a second read transfer time when the first data is read, the second read transfer time being less than the first read transfer time, and
   when a read command is received after the first command, cause the first data written by the second method to be read from the memory array and transferred to the host device.

2. The memory system according to claim 1, wherein the controller is further configured to:
   cause the first data written in the memory array using the second method to be read and then rewritten into the memory array using the first method when a second command is received from the host device.

3. The memory system according to claim 1, wherein the controller is further configured to:
   cause the first data written into the memory array using the second method to be read and then rewritten into the memory array using the first method when an instruction to power off is received.

4. The memory system according to claim 1, wherein the memory array has a different memory area for each of the first and second methods.

5. The memory system according to claim 4, wherein the controller is configured to maintain a logical-to-physical address conversion table for converting a logical address of data designated by the host device into a physical address of the memory array.

6. The memory system according to claim 1, wherein the controller is configured to maintain a logical-to-physical address conversion table for converting a logical address of data designated by the host device into a physical address of the memory array and to update the logical-to-physical address conversion table upon rewriting the first data using the second method in response to the first command.

7. The memory system according to claim 1, wherein the controller is configured to select the second method based on a data transfer rate of a host interface and a free space of the memory array.

8. The memory system according to claim 1, wherein the memory array comprises NAND-type memory cells.

9. The memory system according to claim 1, wherein the second method is a single-bit level writing method.

10. The memory system according to claim 1, wherein the second method is a two-bit level writing method.

11. A memory controller, comprising:
    a host interface configured to communicate with a host device and receive commands from the host device;
    a memory interface configured to communicate with a memory array; and
    a processor configured to:
    when a write command is received is received from the host device, cause first data to be written into the memory array by a first method which provides a first read transfer time to the host device when the first data is read,
    when a first command is received, cause the first data written by the first method to be read from the memory array, then rewritten into the memory array by a second method which provides a second read transfer time when the first data is read, the second read transfer time being less than the first read transfer time, and
    when a read command is received after the first command, cause the first data written by the second method to be read from the memory array and transferred to the host device.

12. The memory controller according to claim 11, wherein the processor is further configured to:
    cause the first data written in the memory array using the second method to be read and then rewritten into the memory array using the first method when a second command is received from the host device.

13. The memory controller according to claim 11, wherein the processor is further configured to manage a logical-to-physical address conversion table for converting a logical address of data designated by the host device into a physical address of the memory array.

14. The memory controller according to claim 13, wherein
    the memory array uses a copy mode reading when reading the first data, and
    the processor is further configured to manage a secondary logical-to-physical address conversion table in which the initial location of the first data in the memory array prior to the rewriting is tracked.

15. The memory controller according to claim 14, wherein the processor is further configured to update the logical-to-physical address conversion table to associate the logical address of the first data with the initial location from the secondary logical-to-physical address conversion table upon receiving either a second command from the host device via the host interface or a power down notice.

16. The memory controller according to claim 11, wherein the second method is a single-bit level writing method.

17. The memory controller according to claim 11, wherein the memory controller is configured to set a bit-level for the second method based on a data transfer rate of the host interface and a free space of the memory array.

18. A memory control method, comprising:
- writing first data into a memory array using a first writing method which provides a first read transfer time to the host device when the first data is read;
- upon receiving a first command from a host device, reading the first data designated by the first command from the memory array and then rewriting the data to the memory array using a second writing method which provides a second read transfer time to the host device when the first data is read, the second read transfer time being less than the first read transfer time; and
- upon receiving a read command from the host device after the first command, causing the first data written by the second writing method to be read from the memory array and transferred to the host device.

19. The memory control method according to claim 18, wherein the second writing method is a single-bit level writing method.

20. The memory control method according to claim 18, wherein
- the first writing method is a three-bit level writing method or a four-bit level writing method, and
- the second writing method is a two-bit level writing method.

* * * * *